Patented Oct. 9, 1951

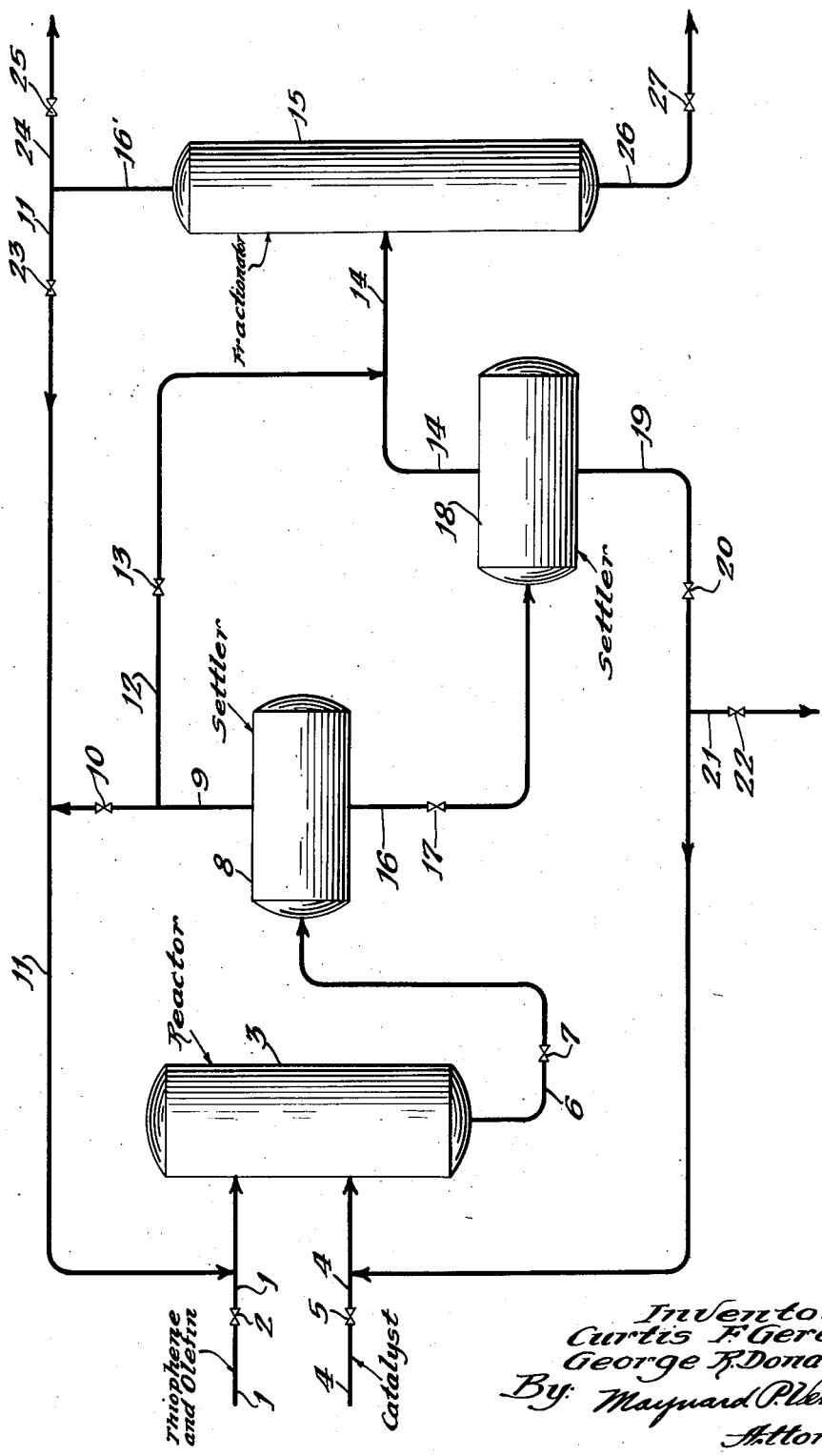

2,570,542

UNITED STATES PATENT OFFICE 2,570,542

PHOSPHORIC ACID CATALYZED THIOPHENE ALKYLATION AND GRAVITY SEPARATION OF RESULTANT PRODUCTS

Curtis F. Gerald, Riverside, and George R. Donaldson, Brookfield, Ill., assignors to Universal Oil Products Company, Chicago, Ill., a corporation of Delaware Application March 12, 1947, Serial No. 734,160

4 Claims. (Cl. 260—329)

This invention relates to the catalytic interaction of condensable thiophenes with compounds capable of yielding a hydrocarbon radical. It is more particularly concerned with the manufacture of alkyl thiophenes by an improved continuous process in which the distillation process requirements are substantially lower than in the processes heretofore used.

It has been shown that thiophene and certain substituted thiophenes such as alkyl thiophenes can be converted into derivatives thereof in good yields by reaction with compounds capable of yielding a hydrocarbon radical in the presence of condensation catalysts. These derivatives are useful as intermediates in organic synthesis and in the production of plastics, germicides, medicinals, insecticides, and the like. We have found an improved method for conducting such condensation reactions.

In one embodiment our invention relates to a condensation process which comprises reacting, in a reaction zone, a thiophene containing a substitutable nuclear hydrogen atom with a compound capable of yielding a hydrocarbon radical at condensation conditions in the presence of a liquid condensation catalyst that is substantially immiscible with hydrocarbons and thiophene, removing the reaction mixture from said zone, separating the mixture into a thiophene phase and a catalyst phase, returning at least a portion of said thiophene phase to the reaction zone, recovering the catalyst phase and subjecting it to further settling to separate therefrom another thiophene phase, and returning at least a portion of the residual catalyst phase to the reaction zone.

The process of our invention is based on the observation that in the alkylation of thiophene with a liquid catalyst such as 85% phosphoric acid, there is a rapid separation, when the mixing is terminated, into a catalyst phase and a thiophene phase. If the catalyst phase is separately recovered and allowed to stand, it separates more slowly into two phases, namely a more pure catalyst layer and another thiophene layer. The concentration of alkylated thiophene is higher in the thiophene phase separated in the second settling than it is in the thiophene phase from the first settling. By recycling the first thiophene phase, which usually predominates in unreacted thiophene, to the reactor and distilling the second thiophene phase for recovery of the alkylated product, a major saving in distillation costs is obtained. This results from the fact that only a portion of the thiophene phase in the reactor effluent need be fractionated to recover the product and no fractionation is needed to recover a stream of unreacted thiophene for recycling. This is in contrast to processes heretofore used, in which all of the catalyst-free reactor effluent has been fractionated to recover a stream of recycle thiophene.

A thiophene which is able to react with a compound capable of yielding a hydrocarbon radical in the presence of a liquid condensation catalyst contains at least one hydrogen atom bound to the heterocyclic ring of four carbon atoms and one sulfur atom. The various reactive thiophenes may be represented by the following formula:

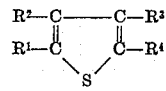

in which at least one of the groups $R^1$, $R^2$, $R^3$ and $R^4$ is a hydrogen atom and the other R groups are selected from the groups consisting of hydrogen, alkyl, cycloalkyl, aryl, aralkyl, alkaryl, and naphthyl radicals. Nonhydrocarbon substituents such as a halogen atom or a methoxy or an alkylthio group may be present provided the thiophene contains at least one substitutable nuclear hydrogen atom.

Compounds capable of yielding a hydrocarbon radical that are utilizable in our process may be alkylating agents, compounds capable of yielding an olefinic radical, or aromatic compounds in which one of the nuclear hydrogen atoms has been replaced by an olefinic hydrocarbon radical.

Alkylating agents that may be used in our process include normally gaseous and normally liquid aliphatic and cyclic olefins such as propylene, butylenes, amylenes, and methylcyclohexene, cycloparaffins containing three or four carbon atoms in the ring, mercaptans, mineral acid esters such as alkyl halides, and alkoxy compounds of the class consisting of aliphatic alcohols, ethers, and esters of carboxylic acids. The various alkylating agents herein mentioned have the property of producing alkyl groups as intermediates or at least as transient intermediates during the course of the reactions which result in the formation of alkylated thiophene compounds. These alkylating agents are not to be regarded as equivalents; for milder operating conditions are needed when processing olefins, for example, than when processing ethers. Similarly, substituted cycloolefins are more easily reacted than non-substituted cycloolefins. Also branched chain aliphatic olefins, such as 2-methyl-1-butene, alkylate thiophene more readily than straight chain olefins, such as normal pentene. Ethylene is quite unreactive. In general, olefinic hydrocarbons that are most useful as alkylating agents in our process comprise the tertiary olefins, which are olefins that contain an unsaturated tertiary carbon atom, such as 2-methyl-2-butene or 1-methyl-1-cyclohexene.

Compounds capable of yielding an olefinic radical that may be employed in our process include polyolefins, particularly diolefins, diols, unsaturated alcohols, and the like. Examples of such compounds are 4-methyl-octatriene-3,5,7,; isoprene, butadiene-1,3,; 2-methyl-1,3-pentadiene, propylene glycol, and allyl alcohol. The various compounds herein mentioned have the property of producing olefinic groups as intermediates or at least as transient intermediates during the course of the reactions which result in the condensation of thiophenes with said compounds. The preferred polyolefins are those of the aliphatic type although cyclic polyolefins and aromatic hydrocarbons containing a polyolefinic side chain also may be employed. These compounds are not to be regarded as equivalent; for different types of products are obtained depending upon the structure of the polyolefinic compound charged to the process and upon the operating conditions. For example, diolefins such as 2-methyl-1,3-pentadiene, in which only one of the double bonds is attached to the tertiary carbon atom, tend to yield alkenyl thiophenes; whereas compounds such as 2,4-hexadiene, in which both of the double bonds are similar, tend to yield dithienyl alkanes. If both double bonds are tertiary, such as in 2,5-dimethyl-1-5-hexadiene, one molecule of thiophene reacts with both double bonds to form a bicyclic compound. In general, it has been found that when alkenyl thiophenes are desired, the reaction condition should be relatively mild and only one of the double bonds of the diolefins should be tertiary. When dithienyl alkanes are desired, the reaction conditions should be somewhat more severe, and the double bonds should be nontertiary.

Examples of aromatic compounds in which one of the nuclear hydrogen atoms has been replaced by an olefinic hydrocarbon radical are styrene, alpha methylstyrene, 1-phenylpropene, allyl benzene, 1-methyl-2-isopropenylbenzene, 2-phenylpentene-2, cyclobutenylbenzene, cyclopenten-1-ylbenzene, and the like. The aromatic ring may have one or more of the hydrogen atoms replaced by groups such as a halogen, hydroxy, methoxy, mercaptal, nitro, etc. In addition the aromatic ring may be mono- or polynuclear. However, the preferred type of alkenyl aromatic compounds are alkenyl aromatic hydrocarbons, particularly those in which the double bond of the alkenyl group is attached to a tertiary carbon atom. This latter type of compound is more readily reacted with thiophenes and forms tertiary aralkylthiophenes in which the aralkyl group is attached to the thiophene nucleus by means of a tertiary carbon atom.

The catalysts that may be used in this process consist of those liquid condensation catalysts which bring about the interaction of thiophene and substituted thiophenes containing at least one replaceable nuclear hydrogen atom with compounds capable of yielding a hydrocarbon radical. Such catalysts include boron fluoride ethyletherate, monohydrxy flueboric acid, mixtures of boron fluoride and water containing a molal excess of water, phosphoric acid, mixtures of phosphoric and sulfuric acid containing less than about 75% of the latter, aqueous solutions of sulfuric acid containing about 25% water, Friedel-Crafts metal halide-hydrocarbon complexes such as are prepared by reacting aluminum chloride with ethylene, sulfuric acid dissolved in acetic acid, and the like. A characteristic of these catalysts is that they dissolve only small amounts of thiophene and hydrocarbons. In general the acid catalysts are preferred.

The condensation step of this process may be conducted at temperatures within the range of from about −20° C. to about 175° C. The preferred temperature will depend to some extent upon the particular thiophene and alkylating agent or other compound capable of yielding a hydrocarbon radical that is charged to the process and upon the activity of the particular catalyst being employed. The pressure should be such that substantially all of the reactants are in the liquid phase. The contact time may be within the range of from about three minutes to about three hours. A molecular excess of the thiophene over the compound capable of yielding a hydrocarbon radical in the reaction zone promotes condensation and suppresses undesirable side reactions.

The process of our invention may be carried out in batch operation by placing a quantity of the catalyst in a reactor equipped with a stirring device, adding the thiophene, heating or cooling to the reaction temperature, slowly adding the compound capable of yielding a hydrocarbon radical while mixing the contents of the reactor, cooling, if necessary, the reaction mixture while stirring is continued, withdrawing the reaction mixture to a first settling zone, removing the catalyst phase from said first settling zone to a second settling zone, and recovering the two phases that appear therein.

The preferred method of operation is of the continuous type and such a process will be described in conjunction with the attached diagrammatic sketch which illustrates one type of apparatus in which our process may be conducted in a continuous manner. For purposes of simplification, auxiliary equipment such as pumps, receivers, and the like have been omitted from the drawing, but it is to be understood that such equipment is to be used wherever engineering skill dictates.

Referring to the drawing, thiophene and a compound capable of yielding a hydrocarbon radical, which will be an olefin in this illustration, are charged through line 1 containing valve 2 and are passed into reactor 3. Fresh make-up catalyst, in this case 85% phosphoric acid, is charged to reactor 3 through line 4 containing valve 5.

The reactor is provided with means such as an impeller and draft tube for intimately contacting the reactants and the catalyst. Sufficient acid is present in the reaction zone to form two phases.

The reaction mixture is withdrawn from the reactor through line 6 containing valve 7 and is passed into primary settler 8. In this first settling zone the reactor effluent rapidly separates into an upper layer that consists primarily of unreacted thiophene together with some alkyl thiophene and unreacted olefins, and a lower layer which comprises primarily phosphoric acid. The upper layer is withdrawn from settler 8 through line 9 containing valve 10 and is passed into line 11 and thence into line 1 and reactor 3. If desired, a portion of the upper layer withdrawn from settler 8 through line 9 may be passed into line 12 containing valve 13 and into line 14 and fractionator 15. However, it is preferred to return all of the upper layer from settler 8 to the reactor.

The catalyst layer in settler 8 is withdrawn through line 16 containing valve 17 and is passed into settler 18, wherein a separation is effected into a lower catalyst layer that has a higher concentration of acid than the material charged to the settler, and an upper layer that consists primarily of unreacted thiophene and alkyl thiophenes.

The lower, catalyst layer in settler 18 is withdrawn through line 19 containing valve 20 and is passed into line 4 and thence into the reactor. A portion of this catalyst phase usually is withdrawn through line 21 containing valve 22 in an amount equal to the volume of fresh catalyst added to the reactor in order to keep the catalyst inventory relatively constant in the process. If the catalyst is of a type that can be regenerated, this may be done and the regenerated catalyst may be returned to the process along with fresh make-up catalyst.

The upper layer in settler 18 is withdrawn through line 14 and is passed into fractionator 15. Unreacted thiophene and olefins are removed overhead from the fractionator through line 16' and passed into line 11 containing valve 23, and are recycled to the reactor. If desired, a part or all of the stream may be diverted through line 24 containing valve 25 and sent to storage or otherwise disposed of. Alkyl thiophenes are withdrawn from fractionator 15 through line 26 containing valve 27.

The concentration of alkyl thiophenes in the upper layer of settler 18 is substantially greater than the concentration of alkyl thiophenes in the upper layer of settler 8. For this reason appreciable economies are effected if the upper layer in settler 8 is recycled to the reactor and only the upper layer from settler 18 is fractionated. In the prior art processes all of the material separated from the catalyst phase has been subjected to fractionation to separate unreacted components from the alkylated thiophene. We avoid fractionation of all of this material by maintaining two settling zones instead of one. It is necessary to the successful operation of our process that the residence time of the catalyst in the first settler be relatively short, i. e., not much longer than the time necessary to form a separate phase. If the catalyst phase is allowed to remain in the first settling zone for a time substantially longer than this, the alkyl thiophenes that are still retained therein will start to separate and will pass from the catalyst phase to the thiophene phase.

The following example is given to illustrate our invention but it is not introduced for the purpose of limiting the generally broad scope of said invention.

*Example*

400 cc. of thiophene and 80 cc. of 85% phosphoric acid were added to a reactor equipped with a stirring device. 220 cc. of isobutylene were added to the reactor while the contents thereof were vigorously agitated. The temperature was maintained below 43° C. Upon completion of the reaction, the reaction mixture was subjected to a first settling. A lower catalyst layer of 200 cc. volume was separated and an upper layer of 493 cc. volume was formed. The acid layer was withdrawn and subjected to a second settling and 103 cc. of a more concentrated acid layer was produced together with 97 cc. of an upper layer. The upper layers produced in both of the settlings consisted primarily of unreacted thiophene. The concentrations of alkyl thiophene in the upper layers in the first and second settlings were 15.6% and 22.7% respectively. The settling time in the first zone was substantially greater than that needed to effect a primary separation of the reaction mixture into two phases. If the time had been shorter in the first zone, the differences between the alkyl thiophene concentrations in the upper layers from the two settlings probably would have been even greater than that actually found.

We claim as our invention:

1. In the art of reacting a thiophene compound having at least one replaceable hydrogen atom bound to the thiophene ring, wherein said hydrogen atom is replaced by a hydrocarbon radical and the reaction effected in the presence of a liquid condensation catalyst which is substantially immiscible with hydrocarbons and thiophene and which consists essentially of 85% phosphoric acid, the method of resolving the catalyst-containing reaction mixture from the zone of reaction which comprises subjecting said mixture, prior to distillation thereof, to an initial incomplete gravity settling for a time sufficient to form a catalyst phase and a phase predominating in unreacted thiophene compound, returning at least a portion of the last-named phase to said zone of reaction, subjecting said catalyst phase to further gravity settling for a time sufficient to separate the same into a layer of increased catalyst concentration and a layer containing reacted thiophene compound and unreacted thiophene compound, returning at least a portion of the first-mentioned layer to said zone, and fractionally distilling the second-mentioned layer to recover the reacted thiophene compound.

2. The process of claim 1 further characterized in that the thiophene compound is reacted with a diolefin.

3. The process of claim 1 further characterized in that the thiophene compound is reacted with an aromatic compound in which one of the nuclear hydrogen atoms has been replaced by an olefinic hydrocarbon radical.

4. The process of claim 1 further characterized in that said thiophene compound is reacted with an olefin containing more than two carbon atoms per molecule.

CURTIS F. GERALD.
GEORGE R. DONALDSON.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,394,905 | Frey | Feb. 12, 1946 |
| 2,415,272 | Benedict | Feb. 4, 1947 |
| 2,426,611 | Hudson | Sept. 2, 1947 |
| 2,458,514 | Kellett | Jan. 11, 1949 |